(12) United States Patent
Holt et al.

(10) Patent No.: US 12,691,943 B1
(45) Date of Patent: Jul. 28, 2026

(54) VEHICLE FRAME

(71) Applicant: ArvinMeritor Technology, LLC, Troy, MI (US)

(72) Inventors: Craig A. Holt, Chesterfield Township, MI (US); Luis G. Schuck, Troy, MI (US); Anish S. Natu, Rochester Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 19/271,904

(22) Filed: Jul. 17, 2025

(51) Int. Cl.
*B62D 21/02* (2006.01)
*B62D 27/06* (2006.01)

(52) U.S. Cl.
CPC ........... *B62D 21/02* (2013.01); *B62D 27/065* (2013.01)

(58) Field of Classification Search
CPC ........ B62D 21/02; B62D 21/03; B62D 21/09; B62D 21/11; B62D 21/12; B62D 21/20; B62D 27/065
See application file for complete search history.

(56) References Cited

U.S. PATENT DOCUMENTS

| | | | | | |
|---|---|---|---|---|---|
| 1,754,926 | A | * | 4/1930 | Birger | B62D 21/02 |
| | | | | | 280/800 |
| 5,005,864 | A | * | 4/1991 | Chachere | B62D 21/12 |
| | | | | | 296/35.1 |
| 5,634,663 | A | * | 6/1997 | Krupp | B62D 21/02 |
| | | | | | 296/29 |
| 5,725,247 | A | * | 3/1998 | Nilsson | B62D 21/02 |
| | | | | | 29/897.35 |
| 6,905,137 | B2 | * | 6/2005 | Fowler | B62D 21/02 |
| | | | | | 280/781 |
| 7,198,298 | B2 | | 4/2007 | Ramsey | |
| 7,261,322 | B2 | * | 8/2007 | Ito | B62D 21/02 |
| | | | | | 280/795 |
| 7,549,660 | B2 | | 6/2009 | Ramsey et al. | |
| 7,600,785 | B2 | * | 10/2009 | Ramsey | B60G 11/27 |
| | | | | | 280/781 |
| 8,998,260 | B2 | * | 4/2015 | Kausch | B62D 21/11 |
| | | | | | 280/124.109 |
| 10,370,033 | B1 | * | 8/2019 | Klein | B62D 21/20 |
| 11,970,210 | B2 | * | 4/2024 | Galazin | B62D 21/03 |
| 12,325,272 | B2 | * | 6/2025 | Eloff | B60G 11/04 |
| 2007/0204550 | A1 | * | 9/2007 | McPherson | B60P 3/1033 |
| | | | | | 52/633 |
| 2024/0383533 | A1 | * | 11/2024 | Shin | B62D 25/2036 |

FOREIGN PATENT DOCUMENTS

JP          2007269123 A   * 10/2007

* cited by examiner

*Primary Examiner* — Laura Freedman
(74) *Attorney, Agent, or Firm* — Jordan IP Law LLC

(57) ABSTRACT

A frame is provided for a vehicle. The frame comprises at least one gusset that includes a connection portion, an attachment portion and a curved portion that is bent and connects the connection portion to the attachment portion. The frame further includes a side rail that supports the at least one gusset at the attachment portion, and a crossmember that is attached to and supported by the at least one gusset at the connection portion and is directly connected to the side rail.

16 Claims, 9 Drawing Sheets

306

308

310

314    312

VEHICLE FRAME

FIELD

The present disclosure relates generally to a frame for a vehicle, and in particular, to a frame that includes at least one gusset that includes a curved portion, a side rail that supports the gusset and a crossmember that is supported by the at least one gusset.

BACKGROUND

Vehicle frames (e.g., movable subframe that supports axles and suspension systems in vehicles such as slider boxes, slider subframes, slider undercarriages, or slider secondary frames) are integrated into vehicles, often in tractor-trailers or semi-trailers. An axle and/or suspension system may include the vehicle frame, as well as springs, shock absorbers or dampers, linkages, etc.

Vehicles may be subject to significant loads. For example, vehicles that contain more than one non-steerable axle (e.g., tractor-trailers), are subject to lateral or side loads. Lateral loads may act through the vehicle in opposite directions, and the effect of such bending loads on the slider box may be significant. Therefore, a vehicle frame may be subjected to strong lateral loads. To address these loads, crossmembers may be incorporated. A crossmember in a vehicle frame has a longitudinal axis that runs across (e.g., transverse relative to a longitudinal axis of the vehicle, left-to-right, etc.) of the vehicle and is a horizontal structure across the vehicle frame, connecting two main longitudinal frame rails or side rails (which have longitudinal axes parallel to the longitudinal axis of the vehicle, or extend in a front-to back direction).

Some prior art vehicle designs rely primarily on welds between crossmembers and other components. Consequently, the welds primarily absorb and distribute force through the crossmembers as the welds directly fuse the crossmembers to surrounding components.

Doing so reduces efficiency of manufacturing as welding is time consuming, requires specialized personnel, and some steps (e.g., painting) cannot occur until the welding is completed. Furthermore, shipping may become cumbersome since the frame is shipped fully assembled (since the welding cannot be done at a destination) and occupies a significant footprint during shipment. Moreover, stiffness of the vehicle frame may be sub-optimal meaning that vehicle racking (vehicle frame changes from a rectangular shape to a skewed rectangle and/or parallelogram shape) is more likely to occur since the welds may suffer from lack of stiffness on the joint.

In some prior art cases, adhesives may be incorporated to attach a cross member to a rib that connects the cross member to a main member. In such cases however, the adhesives may be insufficient to reduce racking under certain circumstances and further requires a significant amount of work.

Thus, techniques that overcome shortcomings of vehicle frame systems would be a welcome addition to the art.

SUMMARY

The present disclosure generally relates to a frame for a vehicle, the frame including at least one gusset that includes a connection portion, an attachment portion and a curved portion that is bent and connects the connection portion to the attachment portion; a side rail that supports the at least one gusset at the attachment portion; and a crossmember that is attached to and supported by the at least one gusset at the connection portion and is directly connected to the side rail.

In some aspects, the techniques described herein relate to a frame, where the at least one gusset includes a pair of gussets, and the crossmember is sandwiched between the pair of gussets at the connection portion.

In some aspects, the techniques described herein relate to a frame, where the at least one gusset includes a pair of gussets that include internal faces facing each other, and external faces facing away from each other, the crossmember is directly connected to one of the external faces.

In some aspects, the techniques described herein relate to a frame, further including at least a first fastener that directly connects the crossmember to a portion of the side rail.

In some aspects, the techniques described herein relate to a frame, where the at least one gusset connects the crossmember to a first wall of the side rail.

In some aspects, the techniques described herein relate to a frame, further including a first fastener that fastens the crossmember to the at least one gusset, where a first vertical plane extends through a longitudinal axis of the first fastener; and a second fastener that fastens the crossmember to the side rail at a position outside of the first vertical plane to directly connect the crossmember to the side rail.

In some aspects, the techniques described herein relate to a frame, further including a third fastener that fastens the crossmember to the side rail at a position outside of the first vertical plane, where a second vertical plane extends through longitudinal axes of the second and third fasteners.

In some aspects, the techniques described herein relate to a frame, where the crossmember is connected to the at least one gusset through a weldless connection, and the first, second and third fasteners are bolts.

In some aspects, the techniques described herein relate to a frame, where the at least one gusset has a welded connection to the side rail.

In some aspects, the techniques described herein relate to a frame, where the crossmember is directly connected to the side rail through a welded connection.

In some aspects, the techniques described herein relate to a frame, where the curved portion has a bend radius measured from a point that is positioned inboard from the at least one gusset In some aspects, the techniques described herein relate to an apparatus including at least one gusset; a side rail that supports the at least one gusset; and a crossmember that is attached to and supported by the at least one gusset, and is directly fixed to the side rail through a weldless connection.

In some aspects, the techniques described herein relate to an apparatus, where the at least one gusset includes a pair of gussets, and the crossmember is sandwiched between the pair of gussets.

In some aspects, the techniques described herein relate to an apparatus, where the at least one gusset includes a pair of gussets that include internal faces facing each other, and external faces facing away from each other, and the crossmember is directly fixed to one of the external faces.

In some aspects, the techniques described herein relate to an apparatus, further including at least a first fastener that directly fixes the crossmember to a portion of the side rail to establish the weldless connection.

In some aspects, the techniques described herein relate to an apparatus, where the at least one gusset connects the crossmember to a first wall of the side rail.

In some aspects, the techniques described herein relate to an apparatus, further including a first fastener that fastens the crossmember to the at least one gusset, where a first vertical plane extends through a longitudinal axis of the first fastener; and a second fastener that fastens the crossmember to the side rail at a position outside of the first vertical plane to directly fix the crossmember to the side rail and establish the weldless connection.

In some aspects, the techniques described herein relate to an apparatus, further including a third fastener that fastens the crossmember to the side rail at a position outside of the first vertical plane, where a second vertical plane extends through longitudinal axes of the second and third fasteners.

In some aspects, the techniques described herein relate to an apparatus, where the at least one gusset has a welded connection to the side rail.

In some aspects, the techniques described herein relate to a suspension system including at least one gusset that includes a connection portion, an attachment portion and a curved portion that is bent and connects the connection portion to the attachment portion; a side rail that supports the at least one gusset at the attachment portion; a fastener; and a crossmember that is directly connected to the connection portion of the at least one gusset at a first position by the fastener, and is directly fixed to the side rail at second and third positions disposed outside a vertical plane that extends through a longitudinal axis of the fastener.

In some aspects, the techniques described herein relate to a frame for a vehicle, the frame including at least one gusset that includes a connection portion, an attachment portion and a curved portion that is bent and connects the connection portion to the attachment portion; a side rail that supports the at least one gusset at the attachment portion; and a crossmember that is attached to and supported by the at least one gusset at the connection portion and is directly connected to the side rail.

In some aspects, the techniques described herein relate to a frame, where the at least one gusset includes a pair of gussets, and the crossmember is sandwiched between the pair of gussets at the connection portion.

In some aspects, the techniques described herein relate to a frame, where the at least one gusset includes a pair of gussets that include internal faces facing each other, and external faces facing away from each other, the crossmember is directly connected to one of the external faces.

In some aspects, the techniques described herein relate to a frame, further including at least a first fastener that directly connects the crossmember to a portion of the side rail.

In some aspects, the techniques described herein relate to a frame, where the at least one gusset connects the crossmember to a first wall of the side rail.

In some aspects, the techniques described herein relate to a frame, further including a first fastener that fastens the crossmember to the at least one gusset, where a first vertical plane extends through a longitudinal axis of the first fastener; and a second fastener that fastens the crossmember to the side rail at a position outside of the first vertical plane to directly connect the crossmember to the side rail.

In some aspects, the techniques described herein relate to a frame, further including a third fastener that fastens the crossmember to the side rail at a position outside of the first vertical plane, where a second vertical plane extends through longitudinal axes of the second and third fasteners.

In some aspects, the techniques described herein relate to a frame, where the crossmember is connected to the at least one gusset through a weldless connection, and the first, second and third fasteners are bolts.

In some aspects, the techniques described herein relate to a frame, where the at least one gusset has a welded connection to the side rail.

In some aspects, the techniques described herein relate to a frame, where the crossmember is directly connected to the side rail through a welded connection.

In some aspects, the techniques described herein relate to a frame, where the curved portion has a bend radius measured from a point that is positioned inboard from the at least one gusset In some aspects, the techniques described herein relate to an apparatus including at least one gusset; a side rail that supports the at least one gusset; and a crossmember that is attached to and supported by the at least one gusset, and is directly fixed to the side rail through a weldless connection.

In some aspects, the techniques described herein relate to an apparatus, where the at least one gusset includes a pair of gussets, and the crossmember is sandwiched between the pair of gussets.

In some aspects, the techniques described herein relate to an apparatus, where the at least one gusset includes a pair of gussets that include internal faces facing each other, and external faces facing away from each other, and the crossmember is directly fixed to one of the external faces.

In some aspects, the techniques described herein relate to an apparatus, further including at least a first fastener that directly fixes the crossmember to a portion of the side rail to establish the weldless connection.

In some aspects, the techniques described herein relate to an apparatus, where the at least one gusset connects the crossmember to a first wall of the side rail.

In some aspects, the techniques described herein relate to an apparatus, further including a first fastener that fastens the crossmember to the at least one gusset, where a first vertical plane extends through a longitudinal axis of the first fastener; and a second fastener that fastens the crossmember to the side rail at a position outside of the first vertical plane to directly fix the crossmember to the side rail and establish the weldless connection.

In some aspects, the techniques described herein relate to an apparatus, further including a third fastener that fastens the crossmember to the side rail at a position outside of the first vertical plane, where a second vertical plane extends through longitudinal axes of the second and third fasteners.

In some aspects, the techniques described herein relate to an apparatus, where the at least one gusset has a welded connection to the side rail.

In some aspects, the techniques described herein relate to a suspension system including at least one gusset that includes a connection portion, an attachment portion and a curved portion that is bent and connects the connection portion to the attachment portion; a side rail that supports the at least one gusset at the attachment portion; a fastener; and a crossmember that is directly connected to the connection portion of the at least one gusset at a first position by the fastener, and is directly fixed to the side rail at second and third positions disposed outside a vertical plane that extends through a longitudinal axis of the fastener.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF DRAWINGS

The foregoing and other features and advantages will be discussed in detail in the following non-limiting description of specific embodiments in connection with the accompanying drawings, in which.

Like reference symbols in the various drawings may indicate like elements.

DESCRIPTION

Figure 1A:
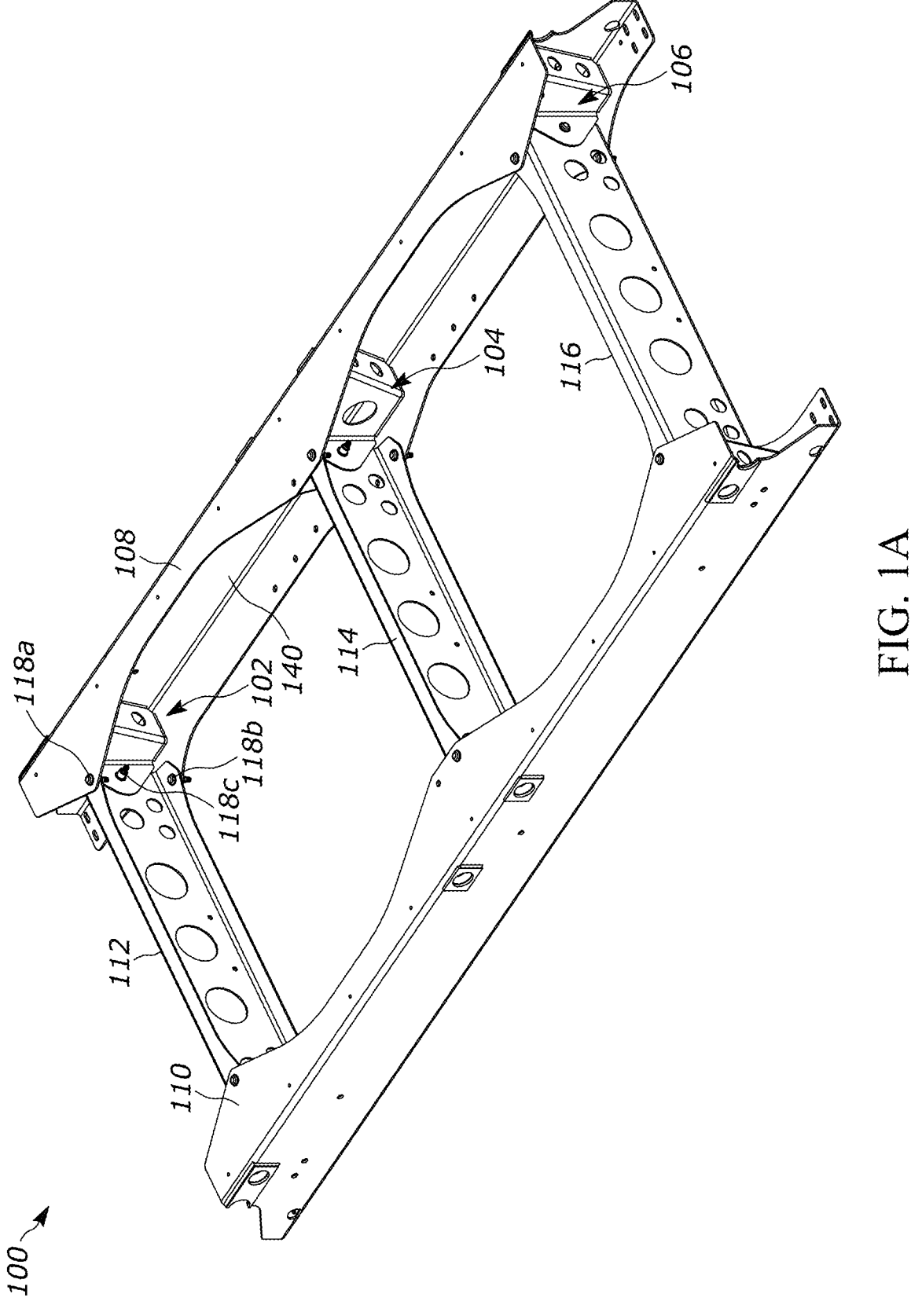
FIGS. 1A, 1B, 1C, 1D and 1E are respective elevational and perspective views of a vehicle frame comprising gussets, side rails and crossmembers according to one or more example implementations of the instant disclosure.
Figure 1B:
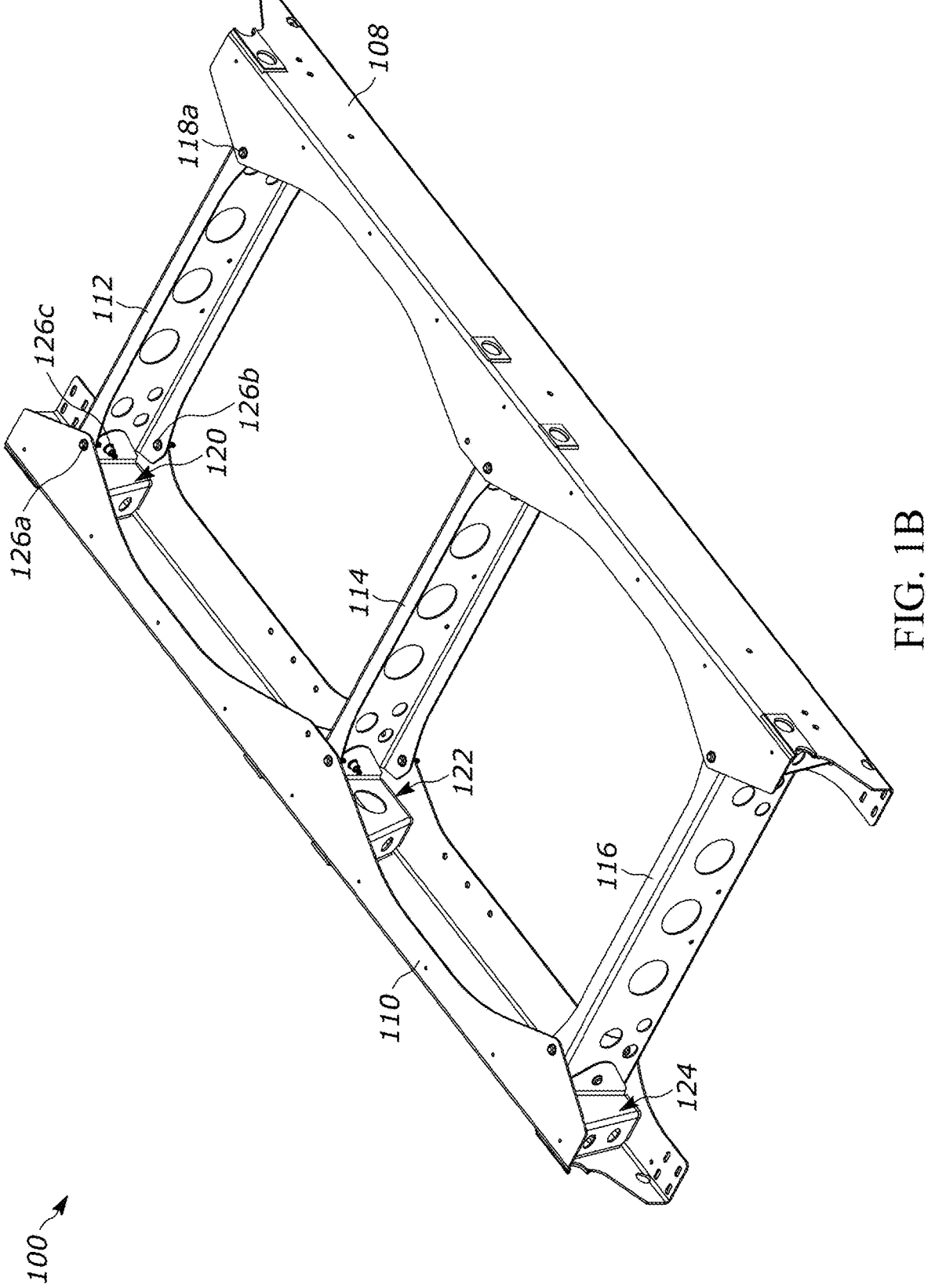

FIGS. 1A and 1B illustrate a vehicle frame 100 that addresses the problems mentioned above. FIGS. 1A and 1B illustrate perspective views of the vehicle frame 100 from laterally opposite sides of the vehicle frame 100. The vehicle frame 100 may include a first side rail 108 and a second side rail 110. The vehicle frame 100 includes first crossmember 112, second crossmember 114 and a third crossmember 116 that provide rigidity and support to the vehicle frame 100. Although three crossmembers are illustrated in FIGS. 1A and 1B, it is understood that the vehicle frame 100 may comprise a greater or lesser number of crossmembers. The first crossmember 112 may be connected to a first gusset pair 102 at one end (FIG. 1A), and to a second gusset pair 120 (FIG. 1B) at an opposite end. Similarly, the second crossmember 114 may be connected to a third gusset pair 104 (FIG. 1A) and a fourth gusset pair 122 (FIG. 1B) at opposite ends, and the third crossmember 116 may be connected to fifth gusset pair 106 (FIG. 1A) and sixth gusset pair 124 (FIG. 1). As will be explained below in further detail, the first crossmember 112, the second crossmember 114 and the third crossmember 116 may be respectively connected with the first gusset pair 102, second gusset pair 120, third gusset pair 104, fourth gusset pair 122, fifth gusset pair 106 and sixth gusset pair 124 as well as the first side rail 108, second side rail 110 to increase structural integrity and reduce racking. Furthermore, the vehicle frame 100 may reduce complexity in manufacturing and shipment (e.g., may be manufactured at a destination, painted before fully assembled, etc.). It is to be noted that while the instant FIGs show the use of gusset pairs (i.e., first gusset pair 102, third gusset pair 104, fifth gusset pair 106, second gusset pair 120, fourth gusset pair 122, sixth gusset pair 124) for attaching separate ends of crossmembers to side rails, it is anticipated that only a single gusset could be used in place of the illustrated gusset pairs.

Figure 1C:
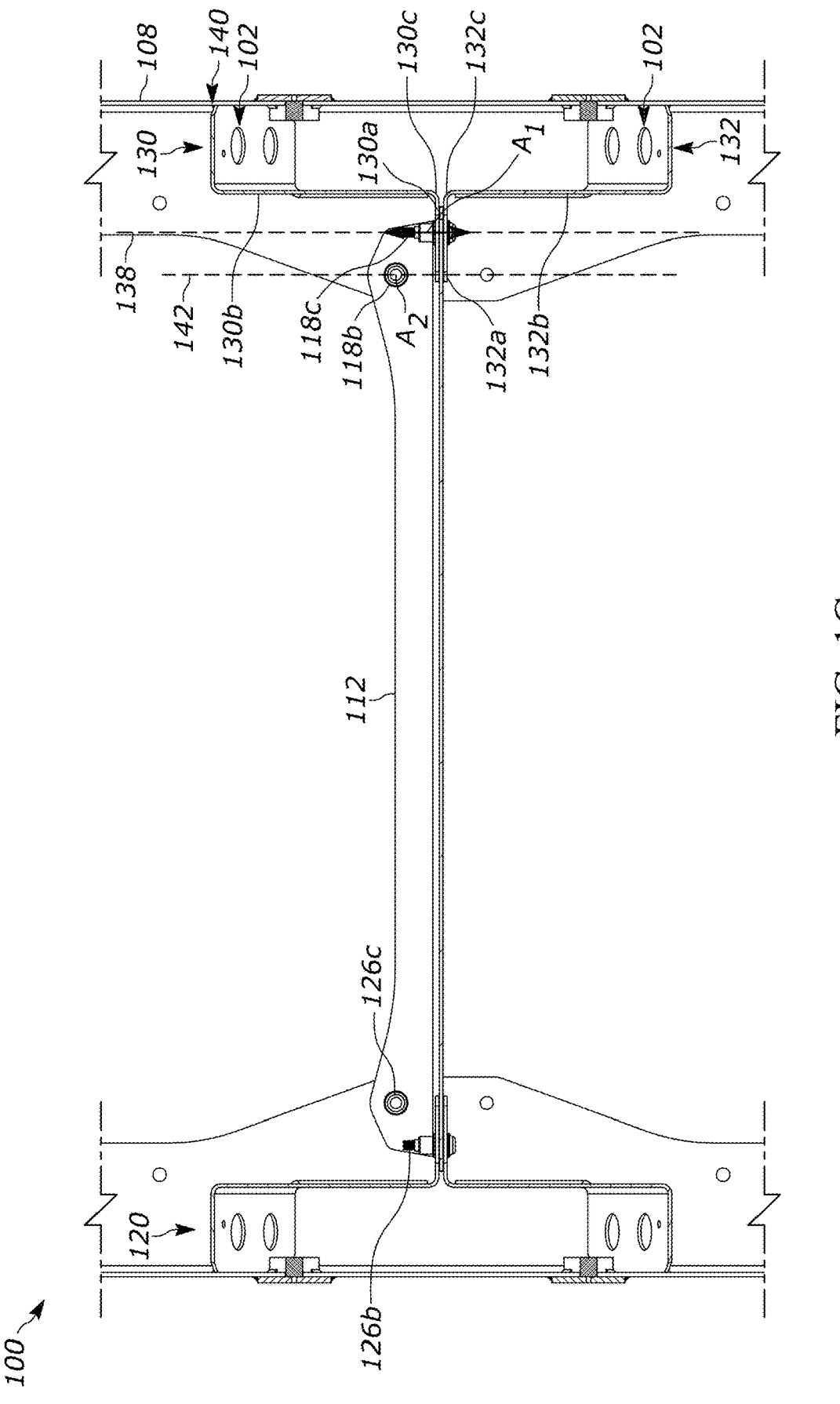

In this example, the first crossmember 112 is coupled to the first gusset pair 102 (at least one gusset) and the first side rail 108 via a fastening system. Turning to FIG. 1C, the first gusset pair 102 includes a pair of gussets comprising a forward gusset 130 and a rearward gusset 132. The forward gusset 130 includes a connection portion 130a, an attachment portion 130b and a curved portion 130c that is bent and connects the connection portion 130a to the attachment portion 130b. As shown, the connections portion 130a is substantially parallel to the first crossmember 112, whereas the attachment portion 130b comprises one section, connected to the curved portion 130c, that is substantially perpendicular to the first crossmember 112 and parallel to the first side rail 108 and another section that is substantially parallel to first crossmember 112 and perpendicular to the first side rail 108. The first side rail 108 supports the forward gusset 130 gusset at the attachment portion 130b (e.g., the forward gusset 130 can be welded to the first side rail 108 at the attachment portion 130b or attached using fasteners). The first crossmember 112 is attached to and supported by the forward gusset 130 at the connection portion 130a through first fastener 118c and is directly connected to the first side rail 108 through second fastener 118a (not visible in FIG. 1C and visible in FIG. 1A) and third fastener 118b (i.e., at least a first fastener). The second fastener 118a, third fastener 118b and first fastener 118c may be huck bolts, though other types of fasteners may also be used.

Similarly, the rearward gusset 132 includes a connection portion 132a, an attachment portion 132b and a curved portion 132c that is bent and connects the connection portion 132a to the attachment portion 132b. The first side rail 108 supports the rearward gusset 132 at the attachment portion 132b. The first crossmember 112 is attached to and supported by the rearward gusset 132 at the connection portion 132a through the first fastener 118c. Accordingly, the forward gusset 130 and the rearward gusset 132 support the first crossmember 112 at the connection portion 132a and connection portion 130a.

As illustrated, in this example the first crossmember 112 is sandwiched between the forward gusset 130 and the rearward gusset 132 at the connection portion 130a and connection portion 132a. The first fastener 118c may penetrate through the connection portion 130a, first crossmember 112 and the connection portion 132a to fasten the first crossmember 112 to the forward gusset 130 and rearward gusset 132. Similarly, the second fastener 118a and the third fastener 118b may penetrate through the first crossmember 112 and the first side rail 108 to fasten the first crossmember 112 and the first side rail 108 together. Notably, the first crossmember 112 may be fastened with the first side rail 108, the forward gusset 130 and the rearward gusset 132 through weldless connections as noted above. Furthermore, the first side rail 108 supports the forward gusset 130 and the rearward gusset 132, and the first crossmember 112 is attached to and supported by the forward gusset 130 and the rearward gusset 132, and is directly fixed to the first side rail 108 through a weldless connection in some examples.

As described above, a load may be applied to the vehicle frame 100. The unique configuration of the first crossmember 112, first side rail 108 and first gusset pair 102 and the fastening system and positioning of second fastener 118a, third fastener 118b, and first fastener 118c may provide sufficient rigidity to reduce racking when such a load is applied. For example, the curvature of the curved portion 130c enables force from the load to be distributed more effectively and evenly compared to sharp edges or angles or only welds. That is, a curved shape allows a more gradual transfer of force, reducing stress concentrations at any single point.

Further, the configuration provides an enhanced joint for first crossmember 112 which results in high rigidity for the vehicle frame 100 (e.g., a slider box) compared to the prior art designs under the event of racking. Furthermore, such a configuration enables efficient sourcing strategies as the configuration does not necessarily need to have any welded connection between the first crossmember 112 and first side rail 108. Doing so allows manufacturers to ship more separate parts in one container and assemble the vehicle frame 100 in a destination factory with the relatively simple processes (e.g., drilling second fastener 118a, third fastener 118b and first fastener 118c). Further, the destination factory has freedom to source crossmembers and side-rails from different suppliers meaning that efficiency and cost-savings may be achieved since the vehicle frame 100 may be manufactured on-site without complicated processes as in prior art designs.

In this example, a longitudinal axis of the connection portion 130a may be perpendicular to a longitudinal axis of the attachment portion 130b, with the curved portion 130c providing a curve between connection portion 130a and attachment portion 130b to offset lateral and/or longitudinal forces. Similarly, a longitudinal axis of the connection portion 132a may be perpendicular to a longitudinal axis of the attachment portion 132b, with the curved portion 132c providing a curve between connection portion 132a and attachment portion 132b to offset forces.

The attachment portion 130b includes a portion directly attached to the first side rail 108. For example, the first side rail 108 may be welded to the attachment portion 130b. Similarly, the rearward gusset 132 may be directly connected with the first side rail 108 through welding at the attachment portion 132b. The forward gusset 130 and rearward gusset 132 connects the first crossmember 112 to a first wall 140 of the first side rail 108. Notably, the forward gusset 130 and the rearward gusset 132 are much smaller in form than the first crossmember 112, and do not significantly impact the cost of shipment if the rearward gusset 132 and forward gusset 130 are welded to the first side rail 108 prior to shipment.

Figure 1D:
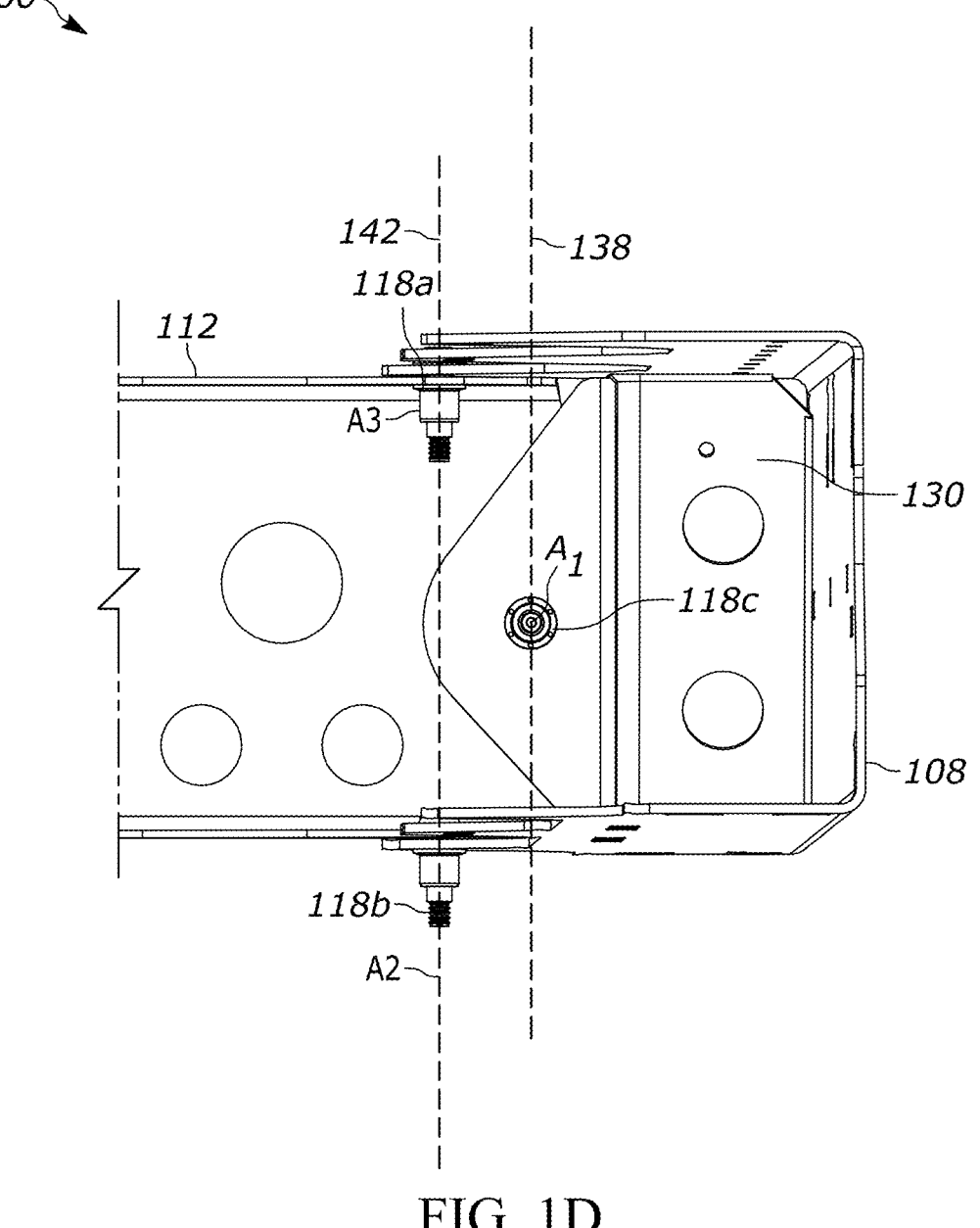

FIG. 1D illustrates a side view of vehicle frame 100. As shown and described, the first fastener 118c fastens the first crossmember 112 to the forward gusset 130. A first vertical plane 138 extends through and along a longitudinal axis $A_1$ of the first fastener 118c. The second fastener 118a and the third fastener 118b fastens the first crossmember 112 to the first side rail 108 at a position outside of the first vertical plane 138 to directly connect the first crossmember 112 to the first side rail 108. A second vertical plane 142 extends through the respective longitudinal axes $A_2$, $A_3$, of the second fastener 118a and third fastener 118b. That is, the second fastener 118a and the third fastener 118b are laterally offset from the first fastener 118c. Doing so reduces deformation from bending loads and increases the reliability and sturdiness of the vehicle frame 100. Accordingly, the first crossmember 112 may be reliably connected to the first side rail 108 to the first gusset pair 102 through a weldless connection, and the second fastener 118a, third fastener 118b and first fastener 118c are bolts. In an embodiment as shown, the first fastener 118c may be positioned at a middle of the forward gusset 130 along a vertical direction (e.g., at a halfway point of the height of the forward gusset 130), though this is not a requirement.

The unique positioning and arrangements of the second fastener second fastener 118a, third fastener 118b and first fastener 118c provide sufficient structural stability without welds. That is, in some examples the first crossmember 112 is fastened to the forward gusset 130 without welds. The rearward gusset 132 can be similarly formed as the forward gusset 130.

Figure 1E:
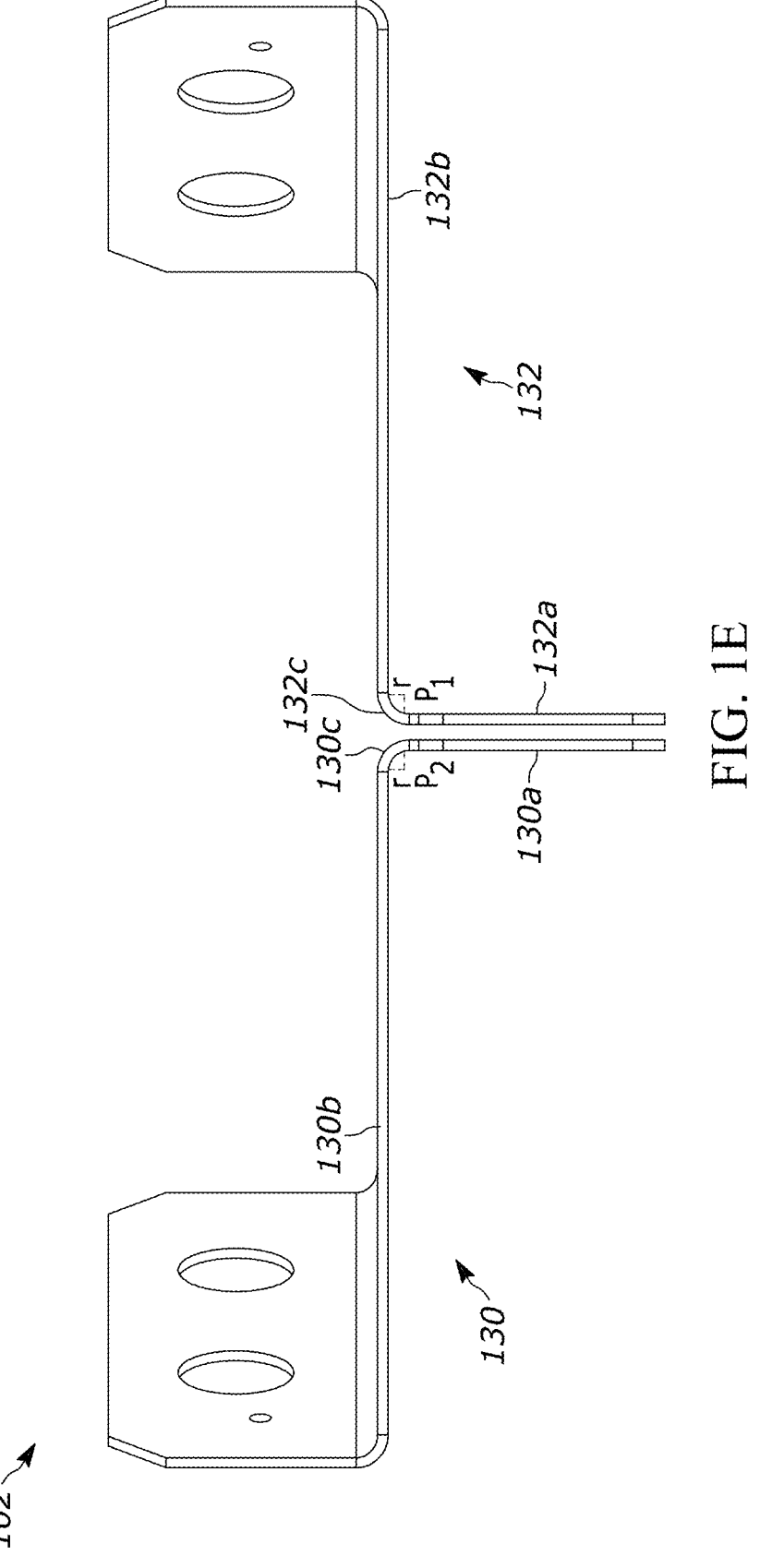

Turning to FIG. 1E, an overhead view of the forward gusset 130 and rearward gusset 132 is illustrated with other components being omitted for clarity. In this example, a point $P_1$ is positioned inboard (e.g., situated on, toward, or closer to the center of the vehicle frame 100) from the rearward gusset 132. The curved portion 132c has a bend radius r measured from the point $P_1$ meaning that a center of a quarter-circle formed by the rearward gusset 132 is at the point $P_1$. Similarly, the point $P_2$ is positioned inboard from the curved portion 130c, and has a bend radius r measured from the point $P_2$ meaning that a center of a quarter-circle formed by the forward gusset 130 is at the point $P_2$. The bends having centers that are positioned inboard relative to the curved portion 130c and curved portion 132c provides stability relative to other designs that have centers of curvature being outboard.

While the rearward gusset 132 and the forward gusset 130 are shown as separate elements, in some examples, the rearward gusset 132 and the forward gusset 130 may be combined into a single gusset. The connection between the first crossmember 112, the first gusset pair 102 and the first side rail 108 is described in detail above. It will be understood that other connections may be similarly formed, such as the first crossmember 112 to the second side rail 110 and the second gusset pair 120 via fasteners 126a, 126b, 126c. The second crossmember 114 may be similarly connected to the third gusset pair 104, first side rail 108, second side rail 110, and fourth gusset pair 122 via fasteners. The third crossmember 116 may be similarly connected to the fifth gusset pair 106, sixth gusset pair 124, first side rail 108 and second side rail 110 via fasteners.

Figure 2:
FIG. 2 is an overhead view of gussets, according to one or more example implementations of the instant disclosure.

Turning now to FIG. 2, a pair of gussets 200 including gussets 202, 204 is illustrated. The gussets 202, 204 are similar to the first gusset pair 102, third gusset pair 104, fifth gusset pair 106, second gusset pair 120, fourth gusset pair 122, sixth gusset pair 124 (FIGS. 1A-1E) with the difference being that the fastener 208 (e.g., a bolt and/or huck bolt) fastens a crossmember 206 to the gussets 202, 204 on an external face 202b of the gusset 202 instead of between the gussets 202, 204. That is, the gussets 202, 204 respectively include internal faces 202a, 204a facing each other, and external faces 202b, 204b facing away from each other. The crossmember 206 is directly connected to one of the external faces 202b, 204b, which in this case is the external face 202b of the forward(?) gusset 202. In other examples the crossmember 206 may be directly connected to (in direct contact with) and supported on external face 204b of the rearward gusset 204. The gussets 202, 204 may be substituted for any one or more of the first gusset pair 102, third gusset pair 104, fifth gusset pair 106, second gusset pair 120, fourth gusset pair 122 and sixth gusset pair 124 (FIGS. 1A and 1B).

Figure 3A:
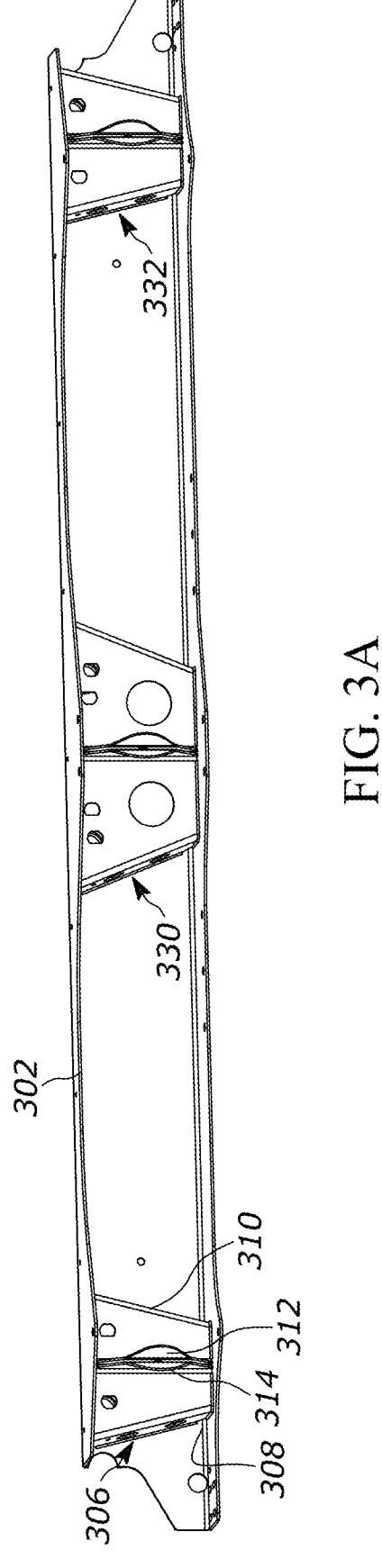
FIGS. 3A, 3B and 3C are respective elevational and perspective views of gussets and side rails according to one or more example implementations of the instant disclosure.
Figure 3B:
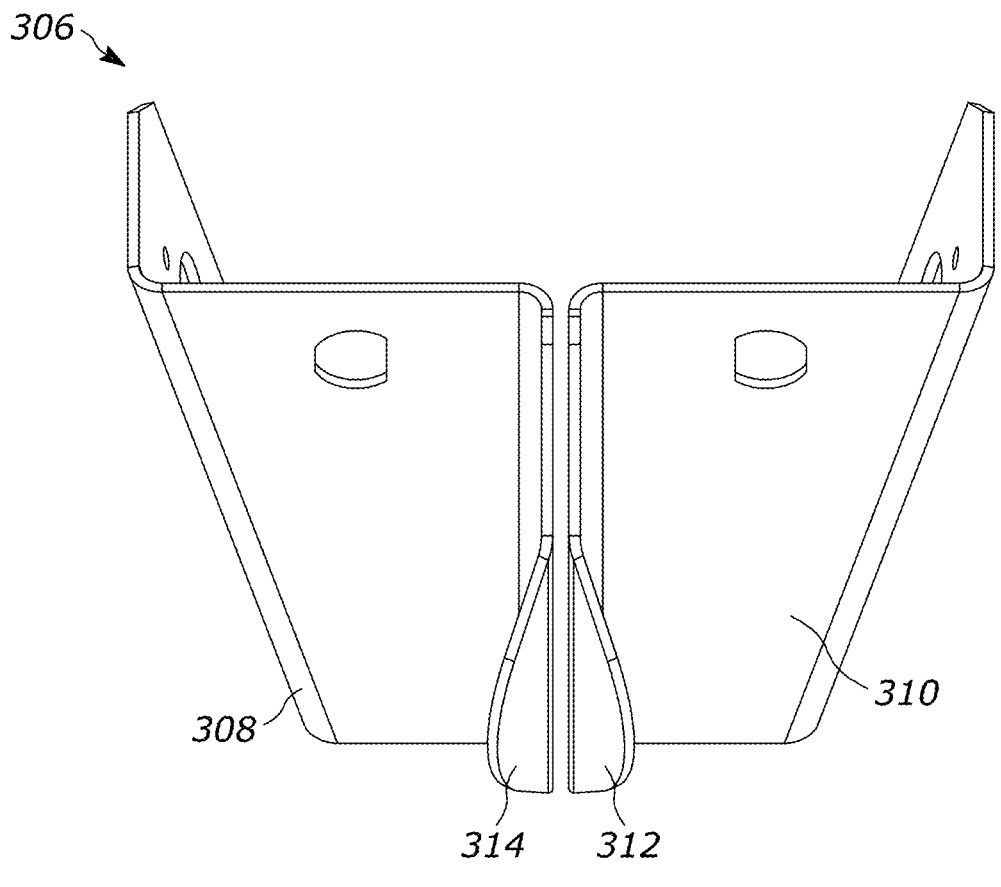
Figure 3C:
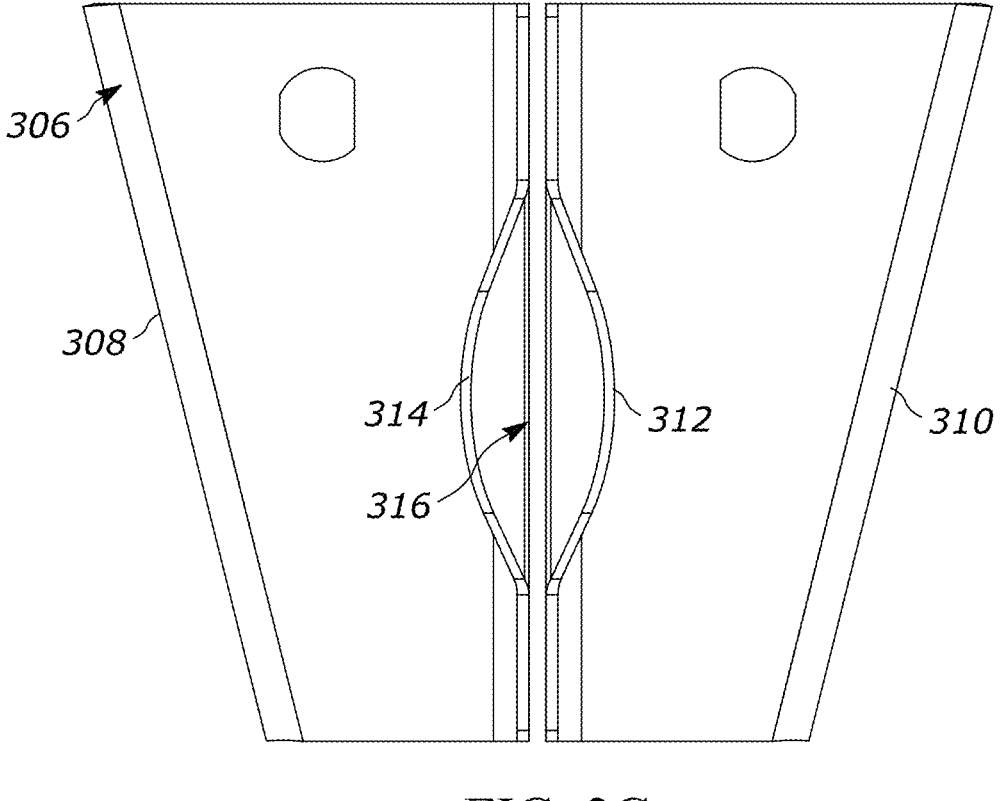

FIGS. 3A-3C shows another example of a pair of gussets 306 that may be readily substituted for the first gusset pair 102, third gusset pair 104, fifth gusset pair 106, second gusset pair 120, fourth gusset pair 122, sixth gusset pair 124 (FIGS. 1A-1E). In this example, the pair of gussets 306 have a bend formed at outwardly extending portions 312, 314 of the gussets 306 that extend outward and away from each other. The gussets 306 may be fastened to the side rail 302 via welding and/or fasteners. The bend of the outwardly extending portions 312, 314 may help placement and positioning of crossmembers (not illustrated).

FIG. 3B shows an overhead view of the gussets 306. A first gusset 308 of the gussets 306 includes the extending portion 314 and a second gusset 310 has the extending portion 312. A crossmember (not shown) may be inserted between the first gusset 308 and the second gusset 310, and specifically between the extending portions 312, 314 at an area 316 (FIG. 3C). FIG. 3C shows a closeup frontal view of the gussets 306. The crossmember may be fastened to the gussets 306 via fasteners and similar to as described above with respect to FIGS. 1A-1E.

Gussets 330, 332 (FIG. 3A) may be fastened to the side rail 302 (FIG. 1A). The gussets 330, 332 may be formed similarly to the gussets 306 and support crossmembers (not illustrated).

It will be appreciated after reading the present disclosure that any standard equipment and/or manufacturing processes may be used singly or in any combination with the processes of the present disclosure. For example, CNC machines, forging equipment, heat treatment furnaces, grinding machines, drilling/boring machines, threading machines, welding equipment, etc. may be used.

The terminology used herein is for the purpose of describing particular implementations only and is not intended to be limiting of the disclosure. As used herein, the singular forms "a", "an" and "the" are intended to include the plural forms as well, including any steps performed by a/the computer/processor, unless the context clearly indicates otherwise. As used herein, the phrase "at least one of A, B, and C" should be construed to mean a logical (A OR B OR C), using a non-exclusive logical OR, and should not be construed to mean "at least one of A, at least one of B, and at least one of C." As another example, the language "at least one of A and B" (and the like) as well as "at least one of A or B" (and the like) should be interpreted as covering only A, only B, or both A and B, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof. Example sizes/models/values/ranges may have been given, although examples are not limited to the same.

The terms (and those similar to) "coupled," "attached," "connected," "adjoining," "transmitting," "communicating," "receiving," "connected," "engaged," "adjacent," "next to," "on top of," "above," "below," "abutting," and "disposed," used herein is to refer to any type of relationship, direct or indirect, between the components in question, and may apply to electrical, mechanical, fluid, optical, electromagnetic, electromechanical or other connections, including logical connections via intermediate components (e.g., device A may be coupled to device C via device B). Additionally, the terms "first," "second," etc. are used herein only to facilitate discussion, and carry no particular temporal or chronological significance unless otherwise indicated.

The corresponding structures, materials, acts, and equivalents (e.g., of all means or step plus function elements) that may be in the claims below are intended to include any structure, material, or act for performing the function in combination with other claimed elements as specifically claimed. While the disclosure describes structures corresponding to claimed elements, those elements do not necessarily invoke a means plus function interpretation unless they explicitly use the signifier "means for." Unless otherwise indicated, recitations of ranges of values are merely intended to serve as a shorthand way of referring individually to each separate value falling within the range, and each separate value is hereby incorporated into the specification as if it were individually recited. Unless explicitly stated as mutually exclusive, features depicted in different drawings may be combined consistent with the principles of the present disclosure. Moreover, although this disclosure describes and depicts respective implementations herein as including particular components, elements, feature, functions, operations, or steps (and arrangements thereof), any of these implementations may include any combination, arrangement, or permutation of any of the components, elements, features, functions, operations, or steps described or depicted anywhere herein that a person having ordinary skill in the art would comprehend after reading the present disclosure.

The description of the present disclosure has been presented for purposes of illustration and description but is not intended to be exhaustive or limited to the disclosure in the form disclosed. After reading the present disclosure, many modifications, variations, substitutions, and any combinations thereof will be apparent to those of ordinary skill in the art without departing from the scope of the disclosure. The implementation(s) were chosen and described to explain the principles of the disclosure and the practical application, and to enable others of ordinary skill in the art to understand the disclosure for various implementation(s) with various modifications and/or any combinations of implementation(s) as are suited to the particular use contemplated. The features of any dependent claim may be combined with the features of any of the independent claims or other dependent claims.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A frame for a vehicle, the frame comprising:
at least one gusset that includes a connection portion, an attachment portion and a curved portion that is bent and connects the connection portion to the attachment portion;
a side rail that supports the at least one gusset at the attachment portion; and
a crossmember that is attached to and supported by the at least one gusset at the connection portion and is directly connected to the side rail, wherein:
the at least one gusset includes a pair of gussets that include internal faces facing each other, and external faces facing away from each other, and
the crossmember is directly connected to one of the external faces.

2. The frame of claim 1, further comprising:
at least a first fastener that directly connects the crossmember to a portion of the side rail.

3. The frame of claim 1, wherein the at least one gusset connects the crossmember to a first wall of the side rail.

4. The frame of claim 3, further comprising:
a first fastener that fastens the crossmember to the at least one gusset, wherein a first vertical plane extends through a longitudinal axis of the first fastener; and
a second fastener that fastens the crossmember to the side rail at a position outside of the first vertical plane to directly connect the crossmember to the side rail.

5. The frame of claim 4, further comprising:
a third fastener that fastens the crossmember to the side rail at a position outside of the first vertical plane, wherein a second vertical plane extends through longitudinal axes of the second and third fasteners.

6. The frame of claim 5, wherein:
the crossmember is connected to the at least one gusset through a weldless connection, and
the first, second and third fasteners are bolts.

7. The frame of claim 1, wherein the at least one gusset has a welded connection to the side rail.

8. The frame of claim 1, wherein the crossmember is directly connected to the side rail through a welded connection.

9. The frame of claim 1, wherein the curved portion has a bend radius measured from a point that is positioned inboard from the at least one gusset.

10. An apparatus comprising:

at least one gusset;

a side rail that supports the at least one gusset; and a crossmember that is attached to and supported by the at least one gusset, and is directly fixed to the side rail through a weldless connection, wherein:

the at least one gusset includes a pair of gussets that include internal faces facing each other, and external faces facing away from each other, and the crossmember is directly fixed to one of the external faces.

11. The apparatus of claim 10, further comprising:

at least a first fastener that directly fixes the crossmember to a portion of the side rail to establish the weldless connection.

12. The apparatus of claim 10, wherein the at least one gusset connects the crossmember to a first wall of the side rail.

13. The apparatus of claim 12, further comprising:

a first fastener that fastens the crossmember to the at least one gusset, wherein a first vertical plane extends through a longitudinal axis of the first fastener; and a second fastener that fastens the crossmember to the side rail at a position outside of the first vertical plane to directly fix the crossmember to the side rail and establish the weldless connection.

14. The apparatus of claim 13, further comprising:

a third fastener that fastens the crossmember to the side rail at a position outside of the first vertical plane, wherein a second vertical plane extends through longitudinal axes of the second and third fasteners.

15. The apparatus of claim 10, wherein the at least one gusset has a welded connection to the side rail.

16. A suspension system comprising:

a pair of gussets that each include a connection portion, an attachment portion and a curved portion that is bent and connects the connection portion to the attachment portion;

a side rail that supports the pair of gussets at the attachment portions;

at least one fastener; and a crossmember that is directly connected to each of the connection portions of the pair of gussets at a first position by a same fastener of the at least one fastener, is sandwiched between the connection portions, and is directly fixed to the side rail at second and third positions disposed outside a vertical plane that extends through a longitudinal axis of the fastener.

\* \* \* \* \*